(12) United States Patent
De'Longhi et al.

(10) Patent No.: US 11,160,413 B2
(45) Date of Patent: Nov. 2, 2021

(54) COFFEE MACHINE WITH IMPROVED COFFEE DISPENSER

(71) Applicant: De'Longhi Appliances S.R.L., Treviso (IT)

(72) Inventors: Giuseppe De'Longhi, Treviso (IT); Enrico Zaratin, Paese (IT)

(73) Assignee: De'Longhi Appliances S.R.L., Treviso (IT)

( * ) Notice: Subject to any disclaimer, the term of this patent is extended or adjusted under 35 U.S.C. 154(b) by 323 days.

(21) Appl. No.: 16/464,474

(22) PCT Filed: Nov. 27, 2017

(86) PCT No.: PCT/EP2017/080521
§ 371 (c)(1),
(2) Date: May 28, 2019

(87) PCT Pub. No.: WO2018/096142
PCT Pub. Date: May 31, 2018

(65) Prior Publication Data
US 2019/0374062 A1    Dec. 12, 2019

(30) Foreign Application Priority Data
Nov. 28, 2016   (IT) .................. 102016000120421

(51) Int. Cl.
*A47J 31/44* (2006.01)
*A23F 5/24* (2006.01)
*A47J 31/46* (2006.01)

(52) U.S. Cl.
CPC ............. *A47J 31/4482* (2013.01); *A23F 5/24* (2013.01); *A47J 31/46* (2013.01)

(58) Field of Classification Search
CPC .............................. A47J 31/46; A47J 31/4482
See application file for complete search history.

(56) References Cited

U.S. PATENT DOCUMENTS

2017/0208989 A1* 7/2017 Meier ................ A47J 31/4482

FOREIGN PATENT DOCUMENTS

| DE | 102014114699 B3 | 3/2016 | |
|----|------|------|------|
| EP | 1512354 A1 | 3/2005 | |
| EP | 2628422 A1 * | 8/2013 | ......... A47J 31/4482 |
| EP | 2628422 A1 | 8/2013 | |

OTHER PUBLICATIONS

International Search Report dated Jan. 15, 2018; International Application No. PCT/EP2017/080521; International Filing Date: Nov. 27, 2017; 4 pages.
Written Opinion dated Jan. 15, 2018; International Application No. PCT/EP2017/080521; International Filing Date Nov. 27, 2017; 6 pages.

* cited by examiner

*Primary Examiner* — John J Norton
(74) *Attorney, Agent, or Firm* — Blank Rome LLP

(57) ABSTRACT

The coffee machine (1) comprises a coffee dispenser having a support (3), a first spout (4) and at least a second spout (5) for dispensing coffee, and a mechanism for connecting the first and at least second spout (4, 5) to the support (3) configured to adjust the position of the first spout (4) and at least a second spout (5) in the direction of the width (L) and at the same time of the height (A) of the coffee machine (1).

19 Claims, 4 Drawing Sheets

COFFEE MACHINE WITH IMPROVED COFFEE DISPENSER

RELATED APPLICATIONS

This application is a U.S. national phase application of International Application No. PCT/EP2017/080521, filed Nov. 27, 2017; which application claims benefit of priority of Italy Application No. 102016000120421, filed Nov. 28, 2016. Each of the above-identified related applications are incorporated by reference.

FIELD OF USE

The present invention relates to a coffee machine equipped with a coffee dispenser having frontally a support sustaining at least two coffee dispensing spouts.

BACKGROUND OF THE INVENTION

One of the problems encountered in the use of such coffee machines of the known type is represented by the difficulty or sometimes the impossibility to manage different heights of cups under the coffee dispenser because of the insufficient distance present between the coffee dispensing spouts and the resting surface for the cups.

To obviate this drawback many coffee machines are equipped with a coffee dispenser height adjustment system.

However, this solution does not solve the problem of the centring of the coffee in the cup according to whether the machine is dispensing into a single cup or simultaneously into two cups and also according to the size of the cups.

This drawback has been resolved by providing movement mechanisms that change the distance between the dispensing spouts in the direction of the width of the coffee machine.

Such movement mechanisms of the known type may however be rather complex and not very precise in their adjustment and can involve trajectories of components that require space that is not always available also considering the current trend to reduce the dimensions of coffee machines as much as possible.

SUMMARY OF THE INVENTION

The technical task of the present invention is, therefore, to provide a coffee machine which obviates the above-described technical drawbacks of the prior art.

Within the scope of this technical task an object of the invention is to realise a coffee machine equipped with an alternative system for moving the coffee dispensing spouts so as to improve the centring of the coffee in the cup.

Another object of the invention is to realise a coffee machine equipped with a system for moving the coffee dispensing spouts that allows simple and precise manual adjustment of the relative position between the coffee dispensing spouts.

Another object of the invention is to realise a coffee machine equipped with a system for moving the coffee dispensing spouts that can be unfolded in extremely reduced spaces.

The technical task, as well as these and other objects, according to the present invention, are reached by realising a coffee machine comprising a coffee dispenser having a support, a first spout and at least a second spout for dispensing coffee, characterised in that it comprises a mechanism for connecting said first and at least second spout to said support configured to adjust the position of said first spout and at least a second spout in the direction of the width and at the same time the height of the coffee machine.

In a preferred embodiment of the invention said mechanism comprises a first connection mechanism for connecting said first spout to said support and at least a second connection mechanism for connecting said second spout to said support, said first and said second mechanism respectively comprising a first and a second hinged quadrilateral, respectively, having hinging axes oriented in the direction of the depth of the coffee machine.

Preferably the hinged quadrilateral is a parallelogram.

For the centring of the coffee in the cup, mechanisms are therefore used that are substantially unfolded in a single movement plane and leave the orientation of the dispensing nozzles unchanged.

Advantageously a means is provided for synchronising the movement of said first and second spout that allows a precise relationship between the position of the two dispensing spouts to be maintained.

Advantageously, a deceleration means for decelerating the movement of said first and second mechanism is also provided As well as stabilising the positions achieved by the dispensing spouts in their stroke, the deceleration means contributes to improving the perception of the movement by the user who manually pulls a dispensing spout to activate the mechanisms.

The present invention also discloses a centring method of the dispensing of coffee in a coffee machine comprising at least two spouts for dispensing coffee, characterised in that it consists of moving in a synchronised way said two spouts, maintaining them at the same height in the direction of the height of the coffee machine and maintaining their axis permanently oriented in the direction of the height of the machine, between a position of maximum mutual distance in the direction of the width of the machine and maximum height in the direction of the height of the machine, and a position of minimum mutual distance in the direction of the width of the machine and minimum height in the direction of the height of the machine.

Other characteristics of the present invention are further defined in the claims hereinbelow.

BRIEF DESCRIPTION OF THE DRAWINGS

Further characteristics and advantages of the invention will become more apparent from the description of a preferred, but not exclusive, embodiment of the coffee machine according to the invention, which is illustrated by way of approximate and non-limiting example in the attached drawings, of which.

DETAILED DESCRIPTION OF THE ILLUSTRATED EMBODIMENTS

Figure 1:
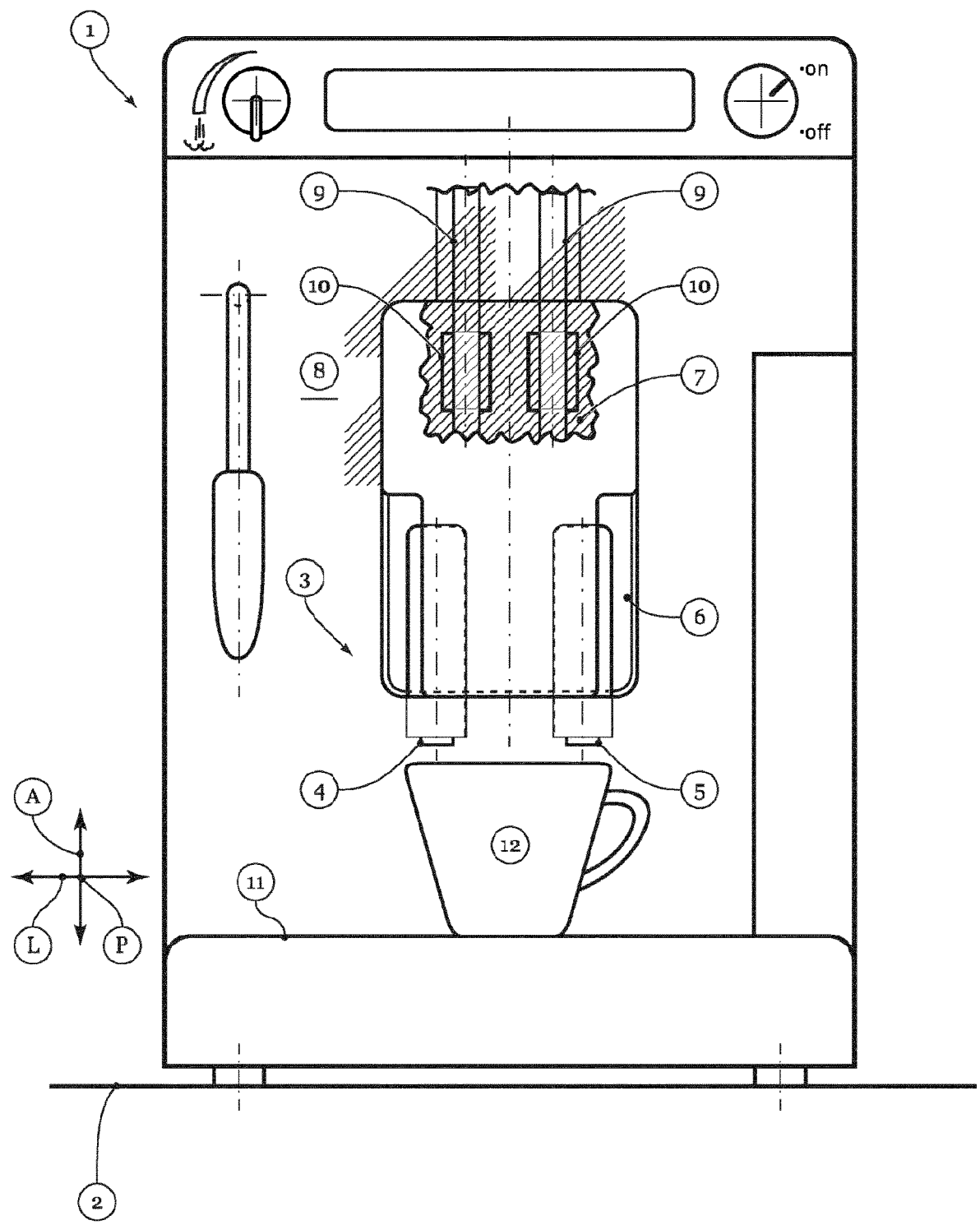
FIG. 1 schematically shows a front view of the coffee machine with the coffee dispensing spouts near to each other.
Figure 2:
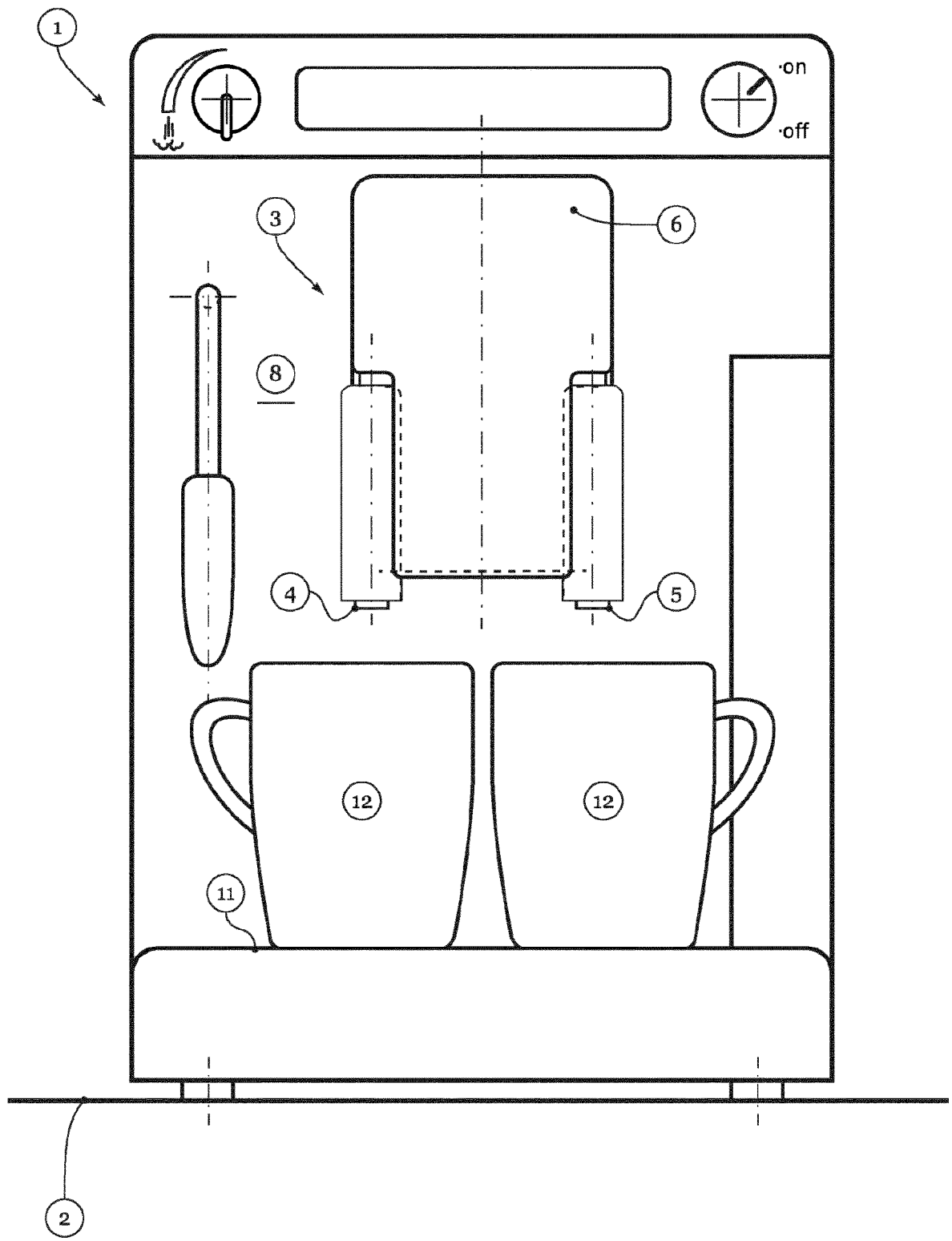
FIG. 2 schematically shows a front view of the coffee machine with the coffee dispensing spouts further from each other.
Figure 3:
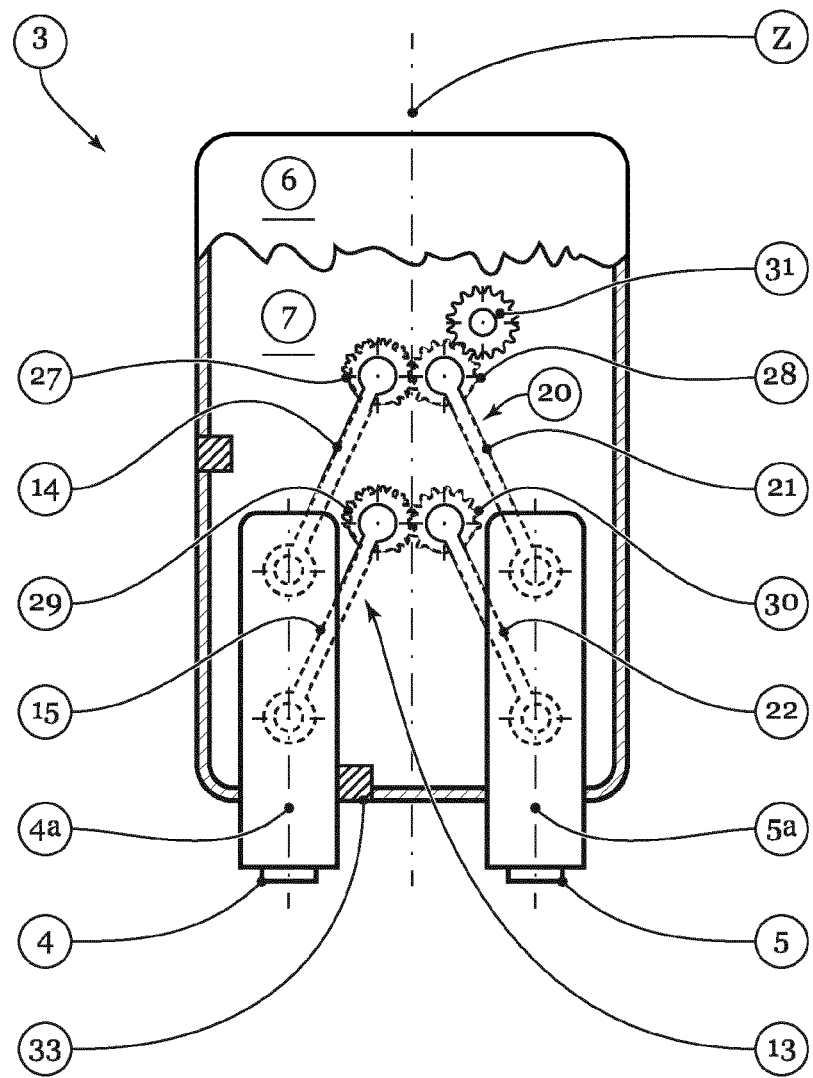
FIG. 3 schematically shows a front view of the coffee dispenser highlighting the mechanisms in the configuration corresponding to the position of the spouts illustrated in FIG. 1.
Figure 4:
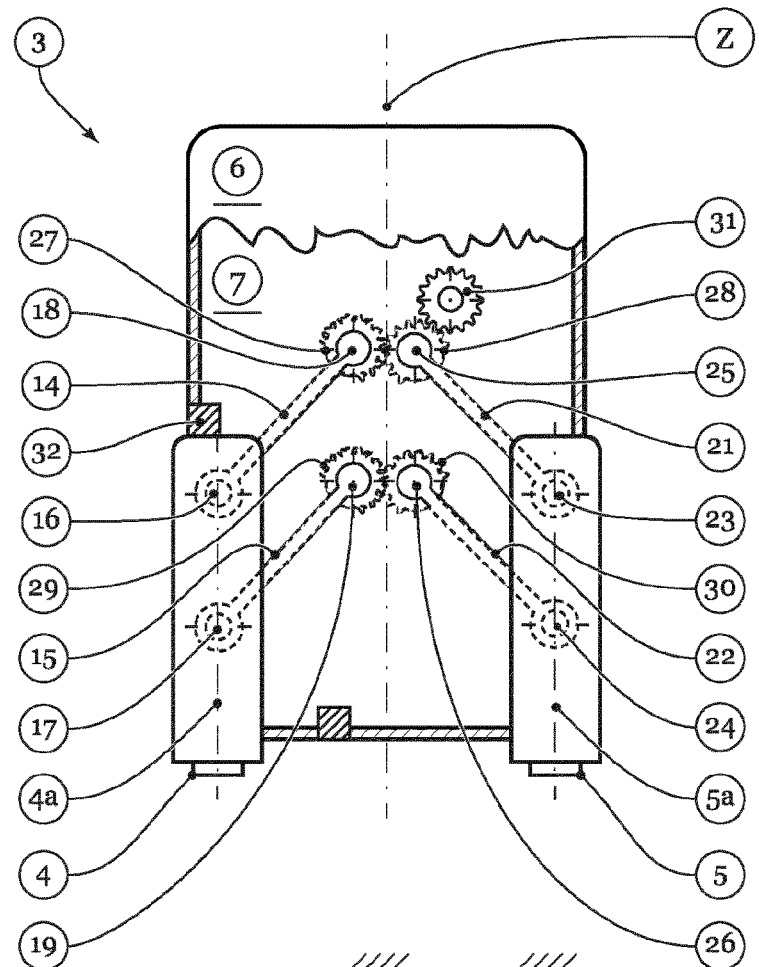
FIG. 4 schematically shows a front view of the coffee dispenser highlighting the mechanisms in the configuration corresponding to the position of the spouts illustrated in FIG. 2.
Figure 5:
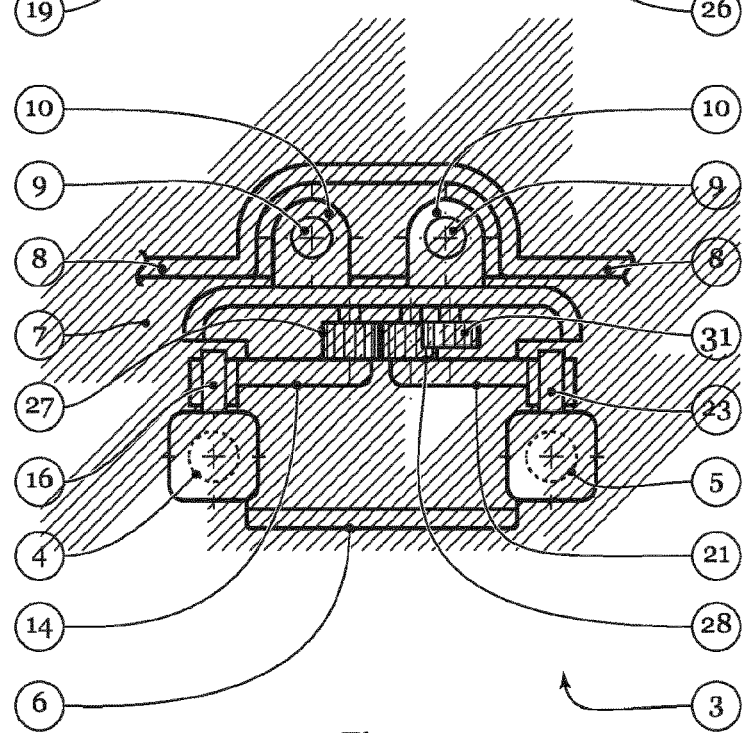
FIG. 5 schematically shows a plan view from above of the coffee dispenser, partially sectioned, highlighting the mechanisms in the same configuration as FIG. 4.

With reference to the figures cited, a coffee machine is shown and indicated in its entirety by reference number 1.

In the following description, the dimension in direction A of the height of the coffee machine 1 means the dimension in an orthogonal direction to the resting surface 2 of the coffee machine 1, the dimension in direction P of the depth of the coffee machine 1 means the dimension in an antero-posterior direction parallel to the resting surface 2, and the dimension in direction L of the width of the coffee machine 1 means the dimension in a parallel direction to the resting surface 2 and orthogonal to the direction P.

The coffee machine 1 has in a known way a hydraulic circuit (not shown) for producing coffee comprising in cascade a water supply pump, a boiler for heating water, an infuser unit for the infusion of coffee powder with hot water, and a dispenser of the coffee drink having two dispensing spouts 4, 5.

Obviously other different layouts of the coffee machine's hydraulic circuit fall within the scope of the invention as long as they have a coffee drink dispenser equipped with at least two dispensing spouts.

The dispenser comprises a support 3 for a specific mechanism provided for the movement of the dispensing spouts 4, 5.

Such mechanism that connects the first spout 4 and the second spout 5 to the support 3 is advantageously configured for the adjustment of the position of the first spout 4 and of the second spout 5 in the direction of the width L and at the same time in the direction of the height A of the coffee machine 1.

The support 3 has a hollow conformation and the mechanism for moving the dispensing spouts 4, 5 is mounted inside it.

The support 3 comprises in particular a front wall 6 and a rear wall 7 that perimetrally delimit the openings for the exit of the dispensing spouts 4, 5.

The support 3 is mounted on the front wall 8 of the coffee machine 1 preferably through translation guides 9, 10 in the direction A of the height of the coffee machine 1.

The translation guides 9, 10 by way of example envisage two rods 9 fixed to the front wall 8 of the coffee machine 1 and two bushings 10 fixed posteriorly to the rear wall 7 of the support 3 and threaded slidably onto the rods 9.

The coffee machine 1 has anteriorly in a known way a resting surface 11 for the cups 12 that extends below the spouts 4, 5 of the dispenser.

The above mechanism comprises a first connection mechanism 13 and a second connection mechanism 20.

The first connection mechanism 13 connects the first spout 4 to the support 3 and is formed by a first hinged quadrilateral, preferably a hinged parallelogram having two rods 14, 15 of equal lengths having hinging axes 16, 17 to the first spout 4 and hinging axes 18, 19 to the support 3 oriented in the direction P of the depth of the coffee machine 1.

The first mechanism 13 supports the first spout 4 with an axis 4a permanently oriented in the direction of the height A of the coffee machine 1. For this purpose both the pair of hinging axes 16, 17 to the first spout 4 and the pair of hinging axes 18, 19 to the support 3 lie in respective planes oriented orthogonally to the direction L of the width of the coffee machine 1.

The second connection mechanism 20 connects the second spout 5 to the support 3 and is formed by a second hinged quadrilateral, preferably a hinged parallelogram having two rods 21, 22 of equal lengths having hinging axes 23, 24 to the second spout 5 and hinging axes 25, 26 to the support 3 oriented in the direction of the depth P of the coffee machine 1.

The second mechanism 20 supports the second spout 5 with an axis 5a permanently oriented in the direction of the height A of the coffee machine 1. For this purpose both the pair of hinging axes 23, 24 to the second spout 4 and the pair of hinging axes 25, 26 to the support 3 lie in respective planes oriented orthogonally to the direction L of the width of the coffee machine 1.

The hinged parallelogram is therefore preferable since it allows a movement of the dispensing spouts 4, 5 without changing their orientation.

The two hinged parallelograms are arranged in a same orthogonal plane to the direction P of the depth of the coffee machine 1.

In particular, the two hinged parallelograms are the same and are arranged symmetrically with respect to a halfway plane Z of the support 3 oriented orthogonally to the direction L of the width of the coffee machine 1.

A specific synchronisation means for synchronising the movement of the two spouts 4, 5 is mounted in the support 3.

The synchronisation means comprises gears provided between the rods 14, 15, 21, 22 of the two hinged parallelograms.

The synchronisation gears comprise two sectors 27, 28 of toothed wheels engaging with each other afforded on the ends of the rods 14, 21 hinged to the support 3, and two sectors 29, 30 of toothed wheels engaging with each other afforded on the ends of the rods 15, 22 hinged to the support 3.

The two hinged parallelograms and the synchronisation means are therefore configured and arranged to coordinate the movement of the two spouts 4, 5 so that they are always located at the same variable height as each other in the direction of the height A of the coffee machine 1.

A specific deceleration means for decelerating the movement of the two mechanisms 13, 20 is mounted in the support 3.

The deceleration means comprises a toothed wheel with a clutch 31 engaging with a sector of toothed wheel, for example the sector of the toothed wheel 28.

Finally, the support 3 is equipped with a first limit stop 32 for the mechanisms at a position of maximum distance between the dispensing spouts 4, 5 in the direction of the width L of the coffee machine 1 and maximum height in the direction of the height A of the coffee machine 1, and a second limit stop 33 for the mechanisms at a position of minimum distance between the dispensing spouts 4, 5 in the direction of the width of the machine and minimum height in the direction of the height A of the coffee machine 1.

Before dispensing the coffee the dispenser can be adjusted if necessary.

For adjusting the dispensing height according to the height of the cup 12, the position of the support 3 is initially adjusted manually by sliding it along its translation guides 9, 10.

For the adjustment of the centring of the coffee in the cup according to the use of one or simultaneously two cups 12, with the support 3 stationary, the user can directly pull just one of the two dispensing spouts 4, 5 given that the other one moves in a synchronised manner.

The adjustment height is also settled due to the synchronised movement of the two dispensing spouts 4, 5.

Obviously for dispensing into a single cup 12 the dispensing spouts 4, 5 must be moved closer to each other, whereas for simultaneous dispensing into two cups 12 the dispensing spouts must be moved away from each other more so the larger the diameter of the cups 12.

When the desired distance is achieved between the dispensing spouts 4, 5 the user releases the grip and the mechanisms remain in the position achieved due to the effect of the action of the wheel 31 with a clutch.

The coffee machine as conceived herein is susceptible to many modifications and variations, all falling within the scope of the inventive concept; furthermore, all the details are replaceable by technically equivalent elements.

In practice the materials used, as well as the dimensions, can be any according to needs and the state of the art.

The invention claimed is:

1. A coffee machine (1) comprising a coffee dispenser having a support (3), a first spout (4) and at least a second spout (5) for dispensing coffee, and further comprising a hinged mechanism that connects said first and at least said second spout (4, 5) to said support, the hinged mechanism being configured to adjust a position of said first and at least said second spout (4, 5) in a direction of a width (L) and of a height (H) of said coffee machine (1),
wherein said hinged mechanism comprises a first mechanism (13) that connects said first spout (4) to said support (3) and at least a second mechanism (20) that connects said second spout (5) to said support (3), said first and said second mechanism (13, 20), respectively, comprising a first and a second hinged quadrilateral, respectively, having hinging axes (18, 19, 25, 26) oriented in a direction (P) of a depth of the coffee machine (1).

2. The coffee machine (1) according to claim 1, wherein said hinged quadrilateral is a parallelogram.

3. The coffee machine (1) according to claim 1, wherein said first and said second mechanism (13, 20), respectively, support said first and said second spout (4, 5), respectively, with an axis (4a, 5a) permanently oriented in a direction (A) of the height of the coffee machine (1).

4. The coffee machine (1) according to claim 3, wherein said support is equipped with a first limit stop (32) for the first and the second mechanisms (13, 20) at a position of maximum distance between said first and said second spout (4, 5) in the direction (L) of the width of the coffee machine (1) and maximum height in the direction (A) of the height of the coffee machine (1), and a second limit stop (33) for the first and the second mechanisms (13, 20) at a position of minimum distance between said first and said second spout (4, 5) in the direction (L) of the width of the coffee machine (1) and minimum height in the direction (A) of the height of the coffee machine (1).

5. The coffee machine (1) according to claim 3, wherein said support (3) is mounted on translation guides (9, 10) in the direction (A) of the height of the coffee machine (1).

6. The coffee machine (1) according to claim 1, wherein said first and said second mechanisms (13, 20) are the same.

7. The coffee machine (1) according to claim 6, wherein said first and said second mechanisms (13, 20) are arranged symmetrically with respect to a plane (Z) of said support (3) oriented orthogonally to the direction (L) of the width of the coffee machine (1).

8. The coffee machine (1) according to claim 1, further comprising a synchronization means for synchronizing a movement of said first and of said second spout (4, 5).

9. The coffee machine (1) according to claim 8, wherein said first and said second mechanisms (13, 20) and said synchronization means are configured and arranged to maintain said first and said second spout (4, 5), with respect to one another, at a same height which is variable in a direction of a height (A) of the coffee machine (1).

10. The coffee machine (1) according to claim 8, wherein said synchronization means comprises gears provided between rods (14, 15, 21, 22) of said first and second connection mechanisms (13, 20).

11. The coffee machine (1) according to claim 10, wherein said gears comprise engaging sectors of toothed wheels (27, 28, 29, 30).

12. The coffee machine (1) according to claim 11, further comprising a deceleration means for decelerating a movement of said first and said second mechanisms (13, 20).

13. The coffee machine (1) according to claim 12, wherein said deceleration means comprises a toothed wheel with a clutch (31) engaging one of said sectors of one of said toothed wheels (28) of said gears.

14. A centring method for dispensing coffee in a coffee machine (1), the coffee machine comprising:
a support (3);
at least two spouts (4, 5) for dispensing coffee:
a first mechanism (13) that connects said first spout (4) to said support (3); and
at least a second mechanism (20) that connects said second spout (5) to said support (3);
said first and said second mechanism (13, 20), respectively, comprising a first and a second hinged quadrilateral, respectively, having hinging axes (18, 19, 25, 26) oriented in a direction (P) of a depth of the coffee machine (1);
the method comprising the step(s) of:
moving in a synchronized way said two spouts (4, 5);
maintaining said two spouts (4, 5) between one another at a same height in a direction (A) of a height of the coffee machine (1); and
maintaining an axis (4a, 5a) of said two spouts (4,5) permanently oriented in the direction (A) of the height of the coffee machine (1), between a position of maximum mutual distance in a direction (L) of a width of the coffee machine (1) and maximum height in the direction (A) of the height of the coffee machine (1), and a position of minimum mutual distance in the direction of the width (L) of the coffee machine (1) and minimum height in the direction of the height (A) of the coffee machine (1).

15. A coffee machine (1) comprising a coffee dispenser including:
a support (3);
a first spout (4) and at least a second spout (5) for dispensing coffee,
a first mechanism (13) that connects said first spout (4) to said support (3); and
at least a second mechanism (20) that connects said second spout (5) to said support (3);
wherein said first and said second mechanism (13, 20), respectively, comprise a first and a second hinged quadrilateral, respectively, having hinging axes (18, 19, 25, 26) oriented in a direction (P) of a depth of the coffee machine (1); and
wherein said first and said second mechanisms (13,20) are configured to adjust a position of said first and at least said second spout (4, 5) in a direction of a width (L) and of a height (H) of said coffee machine (1).

16. The coffee machine (1) according to claim 15, wherein said first and said second mechanism (13, 20), respectively, support said first and said second spout (4, 5), respectively, with an axis (4a, 5a) permanently oriented in a direction (A) of the height of the coffee machine (1).

17. The coffee machine (1) according to claim 15, wherein said first and said second mechanisms (13, 20) are arranged symmetrically with respect to a plane (Z) of said support (3) oriented orthogonally to the direction (L) of the width of the coffee machine (1).

18. The coffee machine (1) according to claim 15, wherein said first and said second mechanisms (13, 20) are configured and arranged to maintain said first and said second spout (4, 5) with respect to one another, at a same height which is variable in a direction of the height (A) of the coffee machine (1).

19. The coffee machine (1) according to claim 15, wherein said support is equipped with a first limit stop (32) for the first and the second mechanisms (13, 20) at a position of maximum distance between said first and said second spout (4, 5) in the direction (L) of the width of the coffee machine (1) and maximum height in the direction (A) of the height of the coffee machine (1), and a second limit stop (33) for the first and the second mechanisms (13, 20) at a position of minimum distance between said first and said second spout (4, 5) in the direction (L) of the width of the coffee machine (1) and minimum height in the direction (A) of the height of the coffee machine (1).

\* \* \* \* \*